J. W. CROWLEY, Jr.
CLUTCH.
APPLICATION FILED NOV. 6, 1916.
1,255,864.
Patented Feb. 12, 1918.
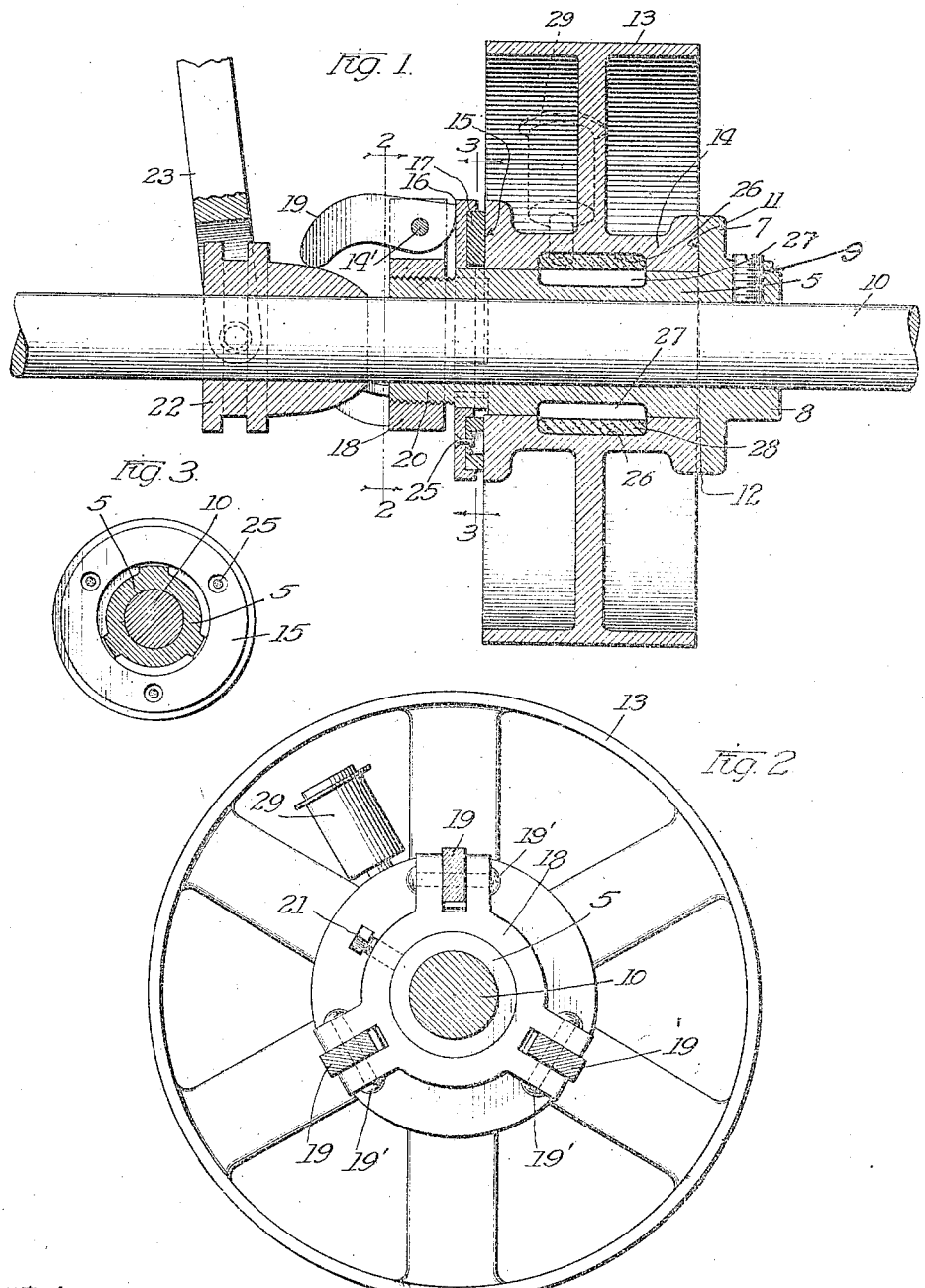

UNITED STATES PATENT OFFICE.

JOHN W. CROWLEY, JR., OF CHICAGO, ILLINOIS.

CLUTCH.

1,255,864.   Specification of Letters Patent.   Patented Feb. 12, 1918.

Application filed November 6, 1916.  Serial No. 129,892.

*To all whom it may concern:*

Be it known that I, JOHN W. CROWLEY, Jr., a citizen of the United States, residing at Chicago, in the county of Cook and State of Illinois, have invented certain new and useful Improvements in Clutches, of which the following is a specification.

My invention relates to clutches.

One of the objects of my invention is generally to improve clutches and to simplify and cheapen the construction of that type of clutch disclosed in United States Letters Patent No. 1,165,392 for clutches granted to me on the 28th day of December, A. D., 1915.

Other and further objects of my invention will become readily apparent, to persons skilled in the art, from a consideration of the following description when taken in conjunction with the drawings, wherein:—

Figure 1 is a central longitudinal section of my improved clutch.

Fig. 2 is a transverse section taken on line 2—2 of Fig. 1.

Fig. 3 is a reduced section taken on line 3—3 of Fig. 1.

In all the views the same reference characters are employed to indicate similar parts.

My invention is concerned essentially with a sleeve, upon which the member to be clutched thereto, such as a pulley, is mounted, so as to render the clutch, as a whole, self-contained and to save the necessity of assembling and adjusting the members, or parts upon a shaft by which the clutch is to be driven.

The sleeve, with its assembled pulley and clutch members, may be put together at the factory and shipped in this condition requiring for its installation on the shaft, upon which it is to be used, only the simple operation of tightening a set screw or the introduction of a key to fasten it to the shaft.

In the illustrative embodiment 5 is a sleeve, threaded at one end, as at 20, and provided with an annular flange 7 extending radially from the hub 8. The sleeve may carry a part, such as key or set screw 9, whereby to secure it to the shaft 10. The flange 7 is provided with a finished face 11 which is in a plane slightly divergent from a plane 90 degrees removed from the axis of the sleeve, whereby the flange is made slightly thicker on one side of the axis than on the other side thereof, as shown by dotted lines, as at 12.

A pulley 13 is mounted for free idle rotation on the sleeve 5 and is provided with an integral hub 14. The surface of one end of the hub, which confronts the surface 11 of the flange, is also oblique from a plane at right angles to the axis of the sleeve, to substantially the same extent, as the surface 11 of the flange, so that if the sleeve be turned within the hub of the pulley these cam-like surfaces will axially move the hub 14, and the pulley, in a direction away from the flange 7. The opposite end surface 15 of the hub 14 may also be divergent from a true right angle plane to perform the clutching function in association with the surface 17 of the plate 16 as hereinafter more specifically pointed out.

A flat annular plate, or ring 16 is loose on the sleeve 5 and is provided with a more or less yielding, cushioning lining 17, such as a flat ring of wood, fiber, or the like, which bears against the end surface 15 of the hub 14 when the parts are in clutching position.

A three-arm spider 18 carries a pivoted finger 19, in the end of each of its arms and is axially adjustable on the threaded end 20 of the sleeve 5. When it has been thus moved, along the sleeve, it may be there fixed by a set screw 21.

A clutch actuating cone 22 is slidable along and freely rotatable on the shaft 10. A hand lever 23 is a means for moving the cone.

When the cone 22 is moved into the position shown in Fig. 1, the longer ends of the fingers 19 ride upon the cone surfaces of this slidable member, pressing the shorter ends of the fingers into intimate contact with the plate 16, thereby moving the plate along the sleeve into close contact with the surface 15 of the hub 14 and slightly moving the pulley 13 until its other hub end surface is brought into contact with the surface 11 of the sleeve flange 7. Now if the sleeve is being rotated, at this time, the rotative movement of the pulley will lag until the longer portion of the hub approaches the thicker portion of the flange 7, the effect of which is to tend to wedge the plate 16 away from the flange 7, by the wedging effect produced by the obliquely extending surfaces of the hub and flange, until the pulley hub and the sleeve 5 are thus firmly clutched together and rotate as one.

The yielding lining 17 of the plate 16 acts as a cushion to prevent too abrupt joining of the clutching members.

The spider 18 is adjustable along the sleeve to compensate for wear of the relatively soft lining 17 and the lining may be removed and replaced by a new lining, when necessary, by removing and replacing the rivets 25.

To provide a self-oiling means for the pulley, within which the sleeve 5 may rotate when the pulley is not clutched thereto, I counter-bore the pulley, as at 26, and cut a corresponding groove 27 around and in the sleeve and in the grove or counter-bore 26 I place a circumferentially extending wick 28. In a threaded perforation, communicating with the annular cavity thus formed, I screw an oil cup 29.

The centrifugal motion will cause the wick to remain in the counter-bore and the wick will prevent the oil from flowing from the cup into the oil cavity except through the capillaries of the wick.

While I have herein shown and described a single embodiment of my invention for the purpose of clear disclosure it is manifest that many changes in the form, configuration and arrangement of the parts could be made, within the scope of the appended claims.

Having described my invention, what I claim is:—

1. A clutch comprising a sleeve; a pulley, or the like, rotatable thereon, provided with a hub, one end of which is surfaced in a transverse plane less than 90 degrees from the axis of the sleeve; a radially extending flange on the sleeve having a similar confronting surface to frictionally engage the adjacent end of the pulley hub; a slidable plate on the sleeve to engage the other end of the hub and a rigid means to force the flange and plate into intimate contact with the respective ends of the pulley hub whereby to directly embrace and hold the pulley between said flange and plate.

2. A clutch comprising a sleeve having a radially extending flange, on one end thereof and having a transversely tapering inner surface; a pulley having an integral hub freely rotatable on said sleeve having its confronting end similarly tapered to be in a plane parallel with the confronting surface of said flange; a plate movable on said sleeve to engage the other end of the hub, and axially movable means to move said plate and hub until the latter is in contact with said flange and to positively hold said parts against further axial movement whereby relative rotations of said hub and sleeve will more firmly hold the parts together.

In testimony whereof I hereunto set my hand in the presence of two subscribing witnesses.

JOHN W. CROWLEY, JR.

In the presence of—
FORÉE BAIN,
MARY F. ALLEN.